(12) United States Patent
Anderson

(10) Patent No.: US 8,196,693 B2
(45) Date of Patent: Jun. 12, 2012

(54) VEHICULAR REGENERATIVE BRAKING SYSTEM

(76) Inventor: Paul S Anderson, Milwaukie, OR (US)

( * ) Notice: Subject to any disclaimer, the term of this patent is extended or adjusted under 35 U.S.C. 154(b) by 199 days.

(21) Appl. No.: 12/724,256

(22) Filed: Mar. 15, 2010

(65) Prior Publication Data

US 2010/0258372 A1 Oct. 14, 2010

Related U.S. Application Data

(60) Provisional application No. 61/168,852, filed on Apr. 13, 2009.

(51) Int. Cl.
*B60K 6/00* (2007.10)
(52) U.S. Cl. .......................................... 180/165; 303/152
(58) Field of Classification Search ................. 180/165; 303/152
See application file for complete search history.

(56) References Cited

U.S. PATENT DOCUMENTS 5,799,562 A * 9/1998 Weinberg ........................ 92/12.2
7,992,948 B2 * 8/2011 Swain et al. .................... 303/152

* cited by examiner

*Primary Examiner* — Jeffrey J Restifo
*Assistant Examiner* — Erez Gurari
(74) *Attorney, Agent, or Firm* — Mark S. Hubert

(57) ABSTRACT

A regenerative braking system for a vehicle, motorized or otherwise, that captures and stores the braking energy of the vehicle through the mechanical compression of a volume of pressurized gas contained in one or more onboard gas springs. This stored energy can be selectively released by the driver to assist with the acceleration of the vehicle from a stopped or moving condition. The compression of the volume of gas is accomplished by the insertion of a plunger into the cylinder of a gas spring by a mechanical spooling cable arrangement powered by the rotative braking of the vehicle. The release of the stored energy is accomplished by the withdrawal of the piston which acts through the spooling cable arrangement to transmit torque to the vehicle's drive train. The system can be implemented in various motorized or non-motorized vehicles.

15 Claims, 15 Drawing Sheets

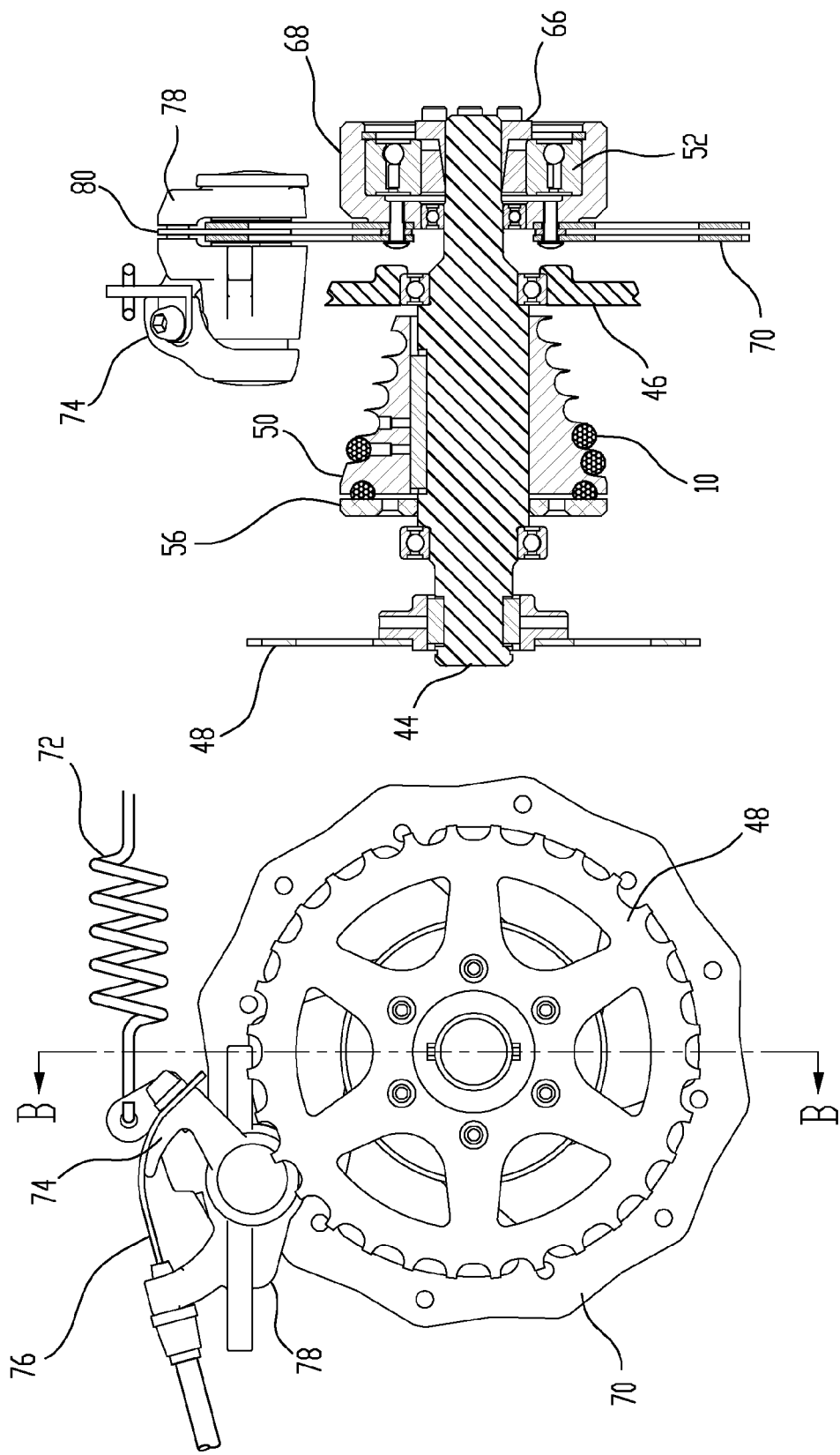

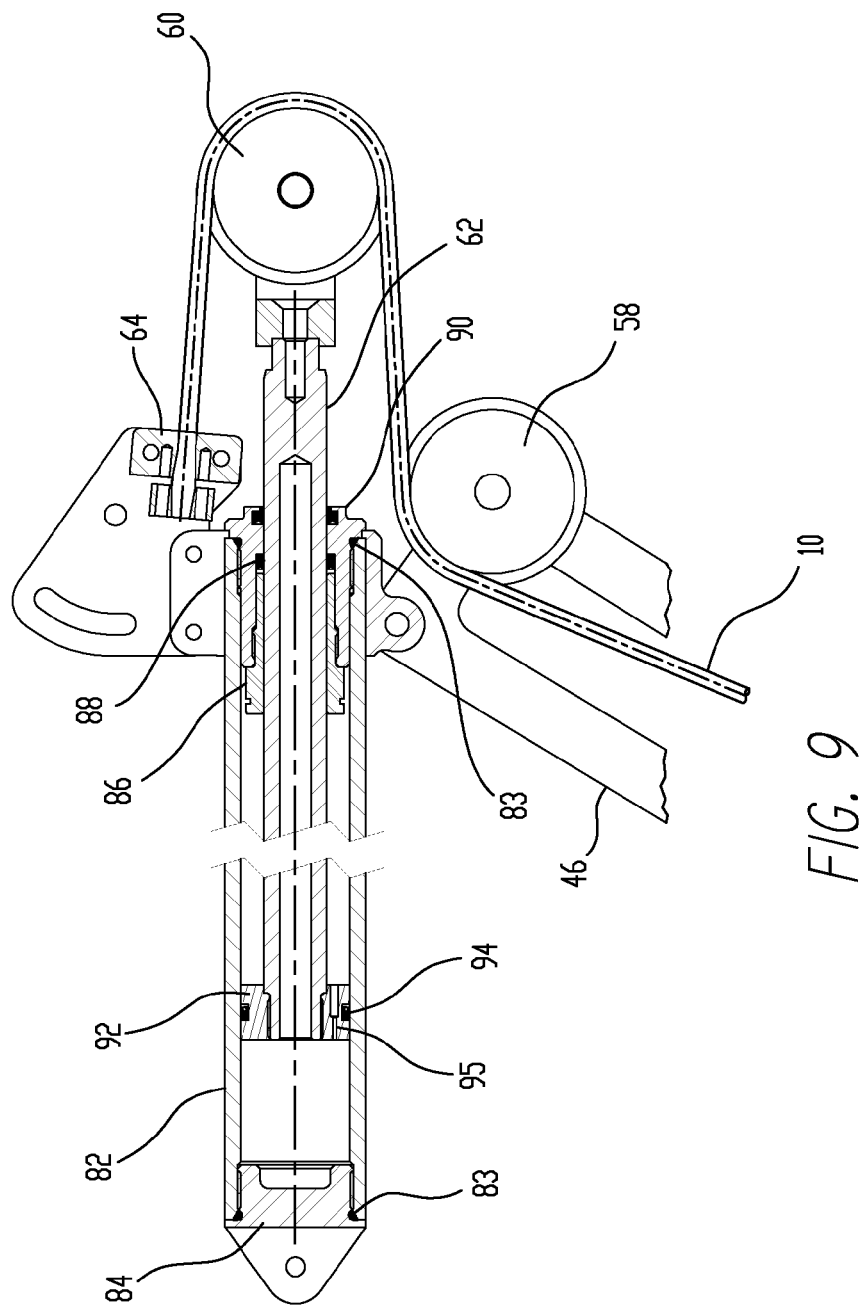
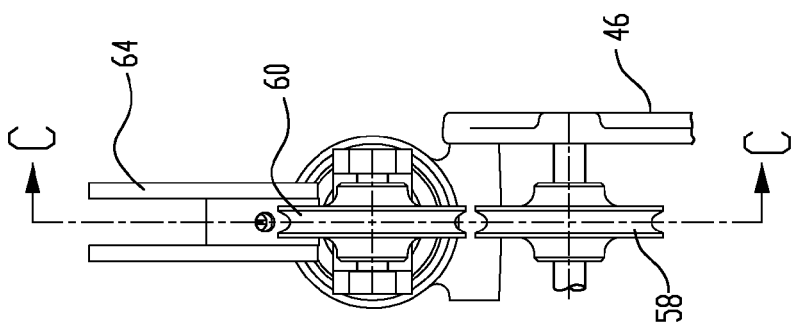

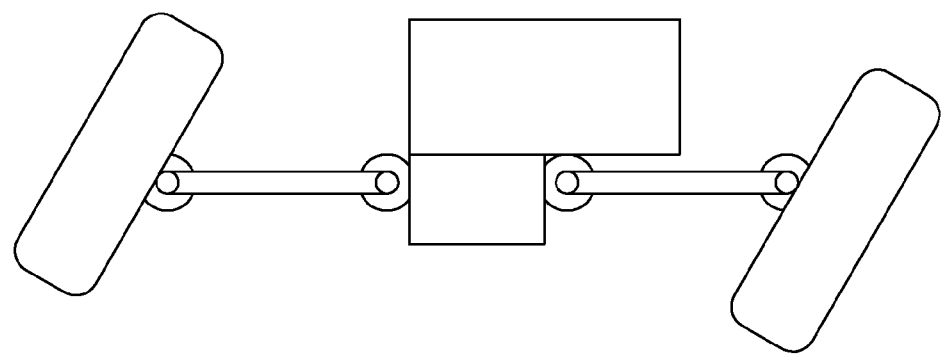
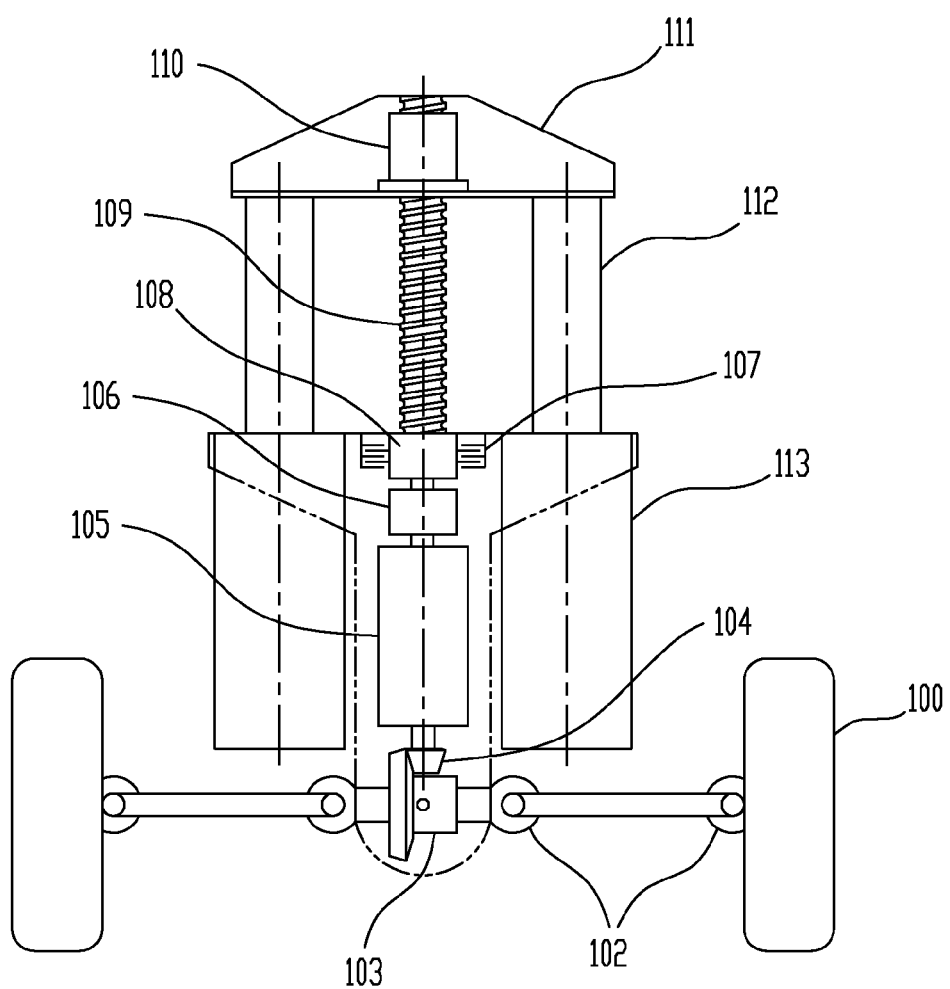
FIG. 10

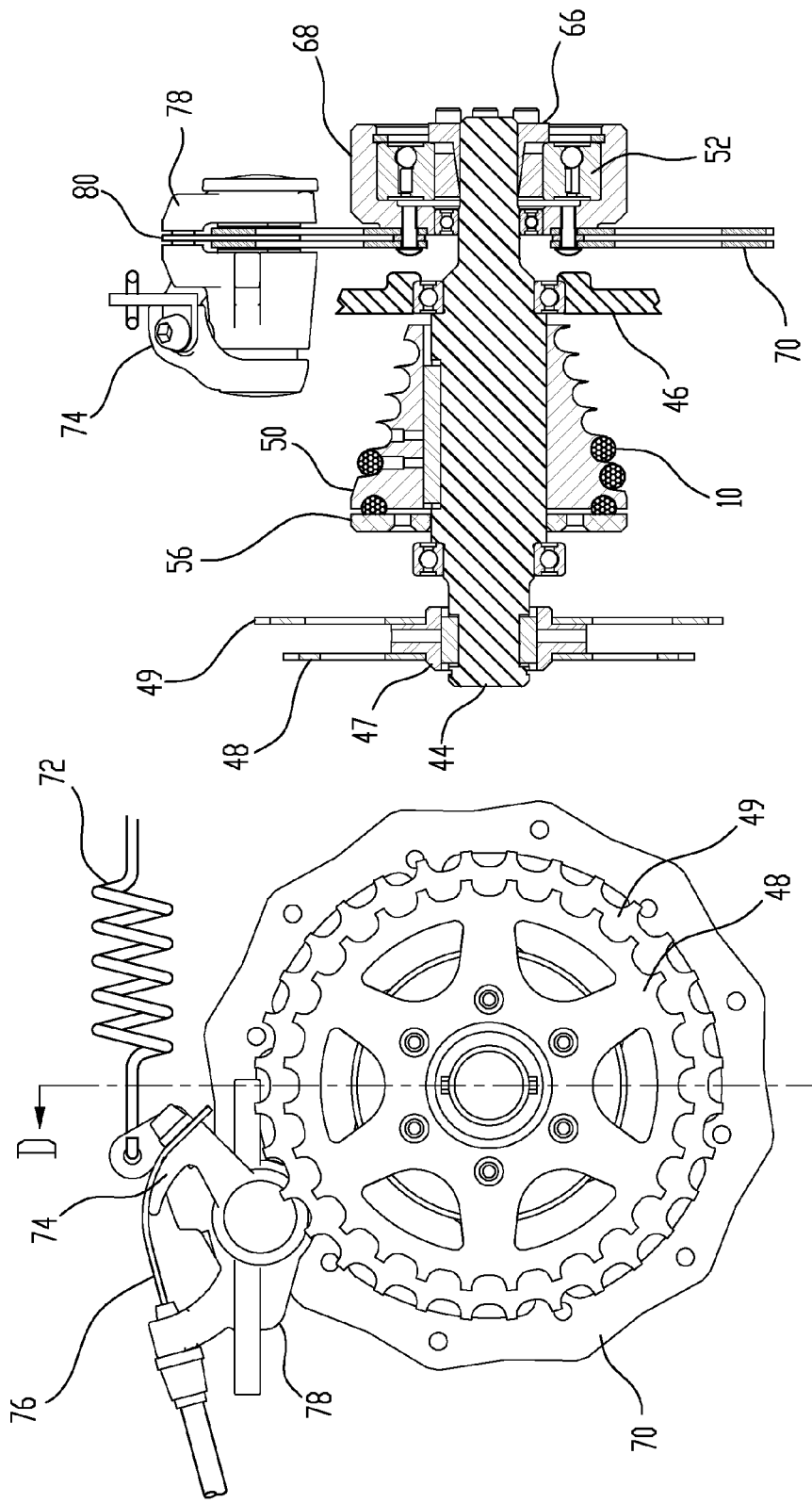

VEHICULAR REGENERATIVE BRAKING SYSTEM

The entire disclosure U.S. Provisional Application No. 61/168,852, filed Apr. 13, 2009 the benefit of which is claimed, is considered to be a part of the disclosure of the accompanying application and is hereby incorporated herein by reference.

BACKGROUND OF THE INVENTION

The present invention relates to a system of capturing and storing the energy of a moving vehicle during the braking process for the future redirection of that stored energy into the vehicle's propulsion system. In this "green" age this regenerative braking system fulfills a longfelt need in the field of vehicular energy conservation. This new invention utilizes and combines known and new technologies in a unique and novel configuration to overcome the drawbacks and problems in the prior art.

SUMMARY OF THE INVENTION

The general purpose of the present invention, which will be described subsequently in greater detail, is to provide a vehicular regenerative braking system that is able to safely store energy that is recaptured during the vehicle's braking process and provide a means for the driver to return this stored energy in the form of additional torque that they selectively input into the vehicle's propulsion system, wether motorized or otherwise.

It has many of the advantages mentioned heretofore and many novel features that result in a new vehicular regenerative braking system which is not anticipated, rendered obvious, suggested, or even implied by any of the prior art, either alone or in any combination thereof.

In accordance with the invention, an object of the present invention is to provide an improved vehicular regenerative braking system capable of capturing and storing energy during braking for selective redirection into the vehicle's propulsion system.

It is another object of this invention to provide a gas spring regenerative braking system suitable for motor vehicles as well as bicycles.

It is a further object of this invention to provide an inexpensive, reliable and safe method for storing and releasing energy captured during vehicular braking into the vehicle's propulsion system.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 6 is a side view of the braking energy transfer assembly;

FIG. 7 is a cross sectional view of the braking energy transfer assembly taken through section B-B of FIG. 6;

FIG. 8 is an end view of the braking energy storage assembly;

FIG. 9 is a cross sectional view of the braking energy storage assembly taken through section C-C of FIG. 8;

FIG. 10 is a top view representational diagram of the first alternate embodiment regenerative braking system;

FIG. 20 is a side view of the energy transfer assembly of the fourth alternate embodiment;

FIG. 21 is a cross sectional view of FIG. 20;

DETAILED DESCRIPTION

Figure 1:
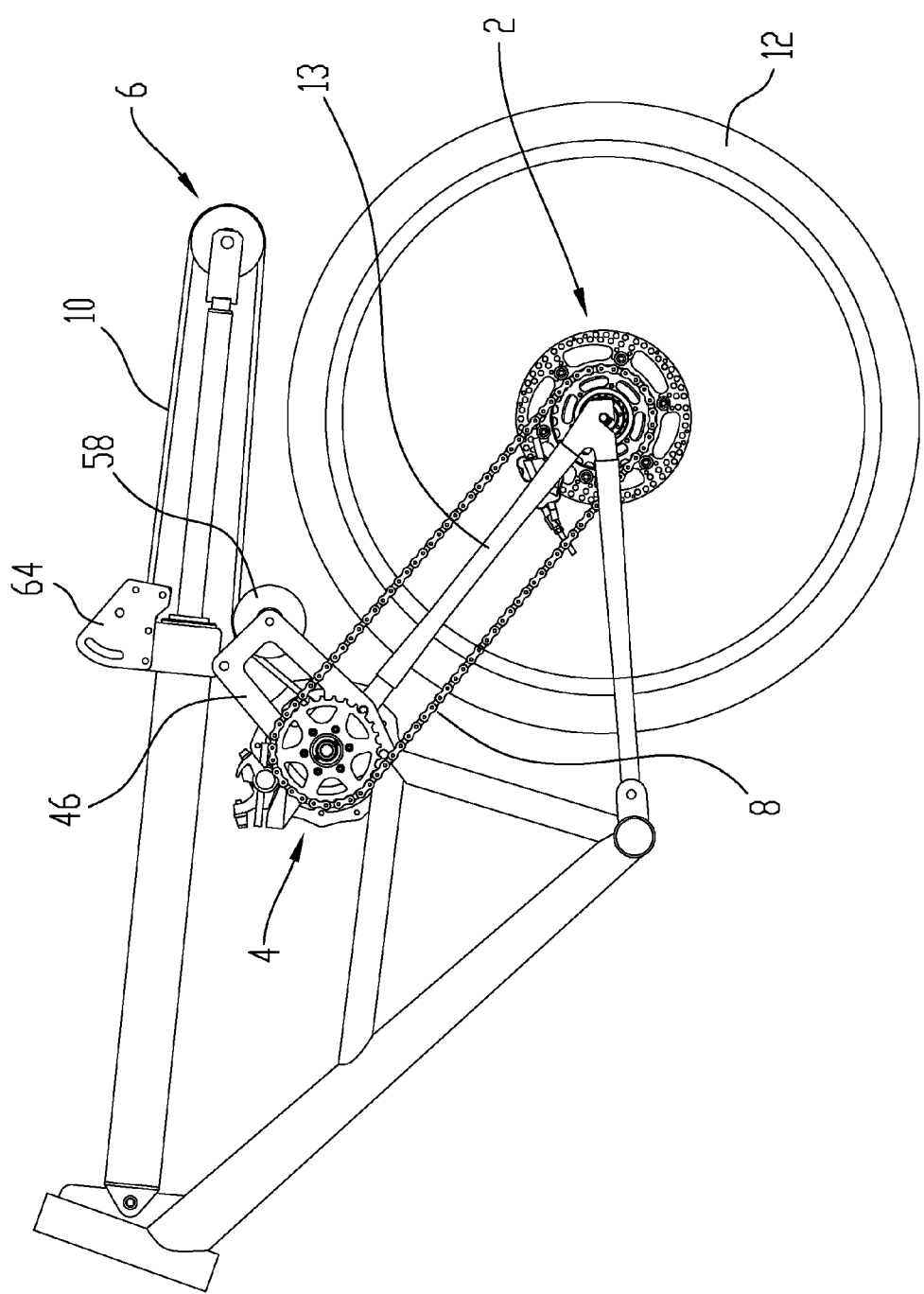
FIG. 1 is a left side view of a partially assembled bicycle showing the general arrangement of all regenerative braking system components.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

The present disclosure concerns embodiments of a regenerative braking system that utilizes one or more gas springs for capturing and storing braking energy of a vehicle, and then drawing on the stored energy to assist acceleration of the vehicle. Basically, the inertia energy of the moving vehicle is converted into rotational energy during braking (via the braking energy capture assembly), that is converted to linear motion (via the braking energy transfer assembly) that compresses a pre-pressurized gas spring assembly that stores the energy in the form of pressurized gas (via the braking energy storage assembly.) The stored pressure energy is released and transmitted as an applied torque to the vehicle's propulsion system. The system can be implemented in various motorized and non-motorized vehicles.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

One of the most practical examples of the present invention is the principal embodiment of the bicycle regenerative braking system.

Figure 2:
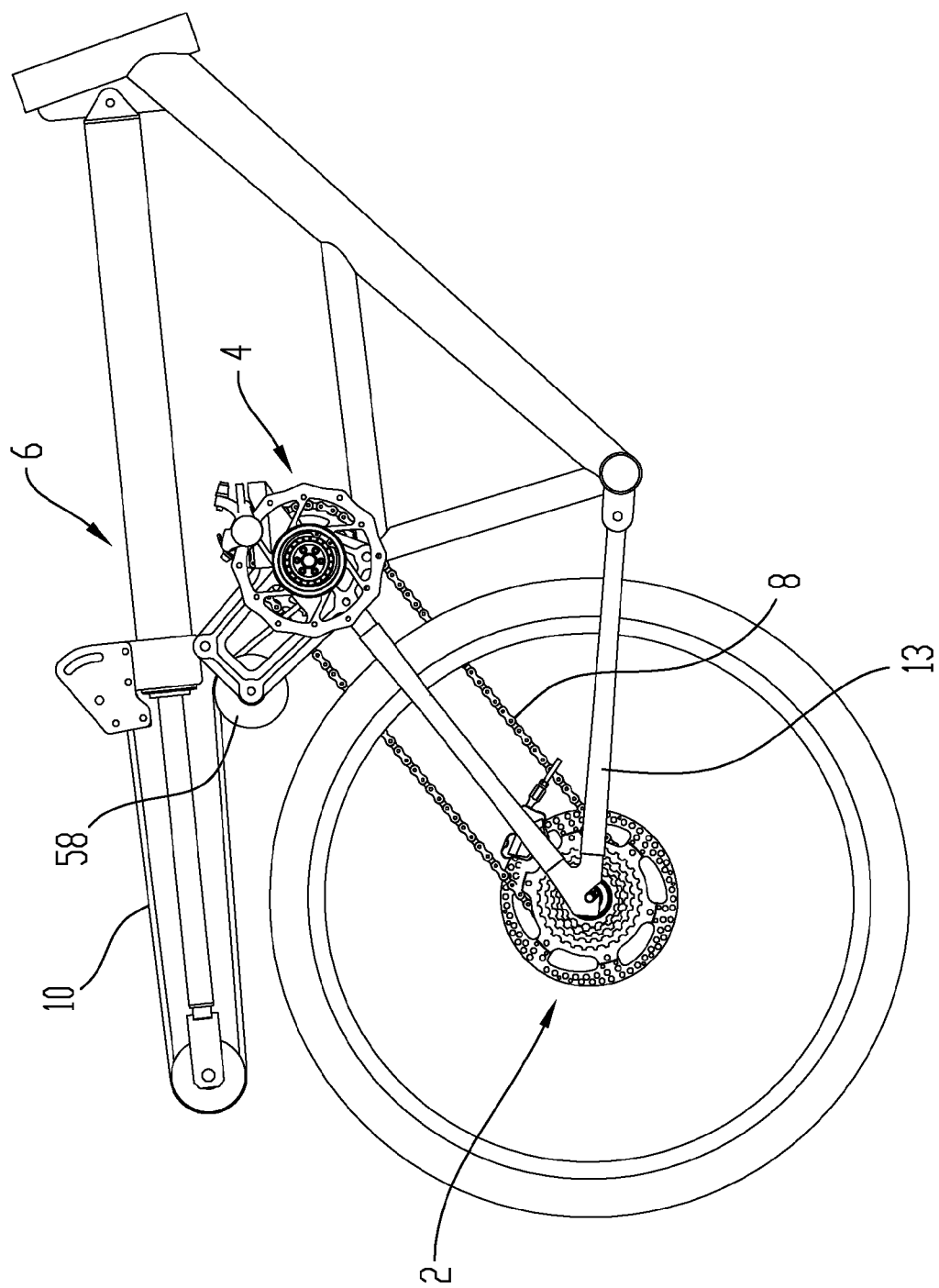
FIG. 2 is a right side view of a partially assembled bicycle showing the general arrangement of all regenerative braking system components.
Figure 3:
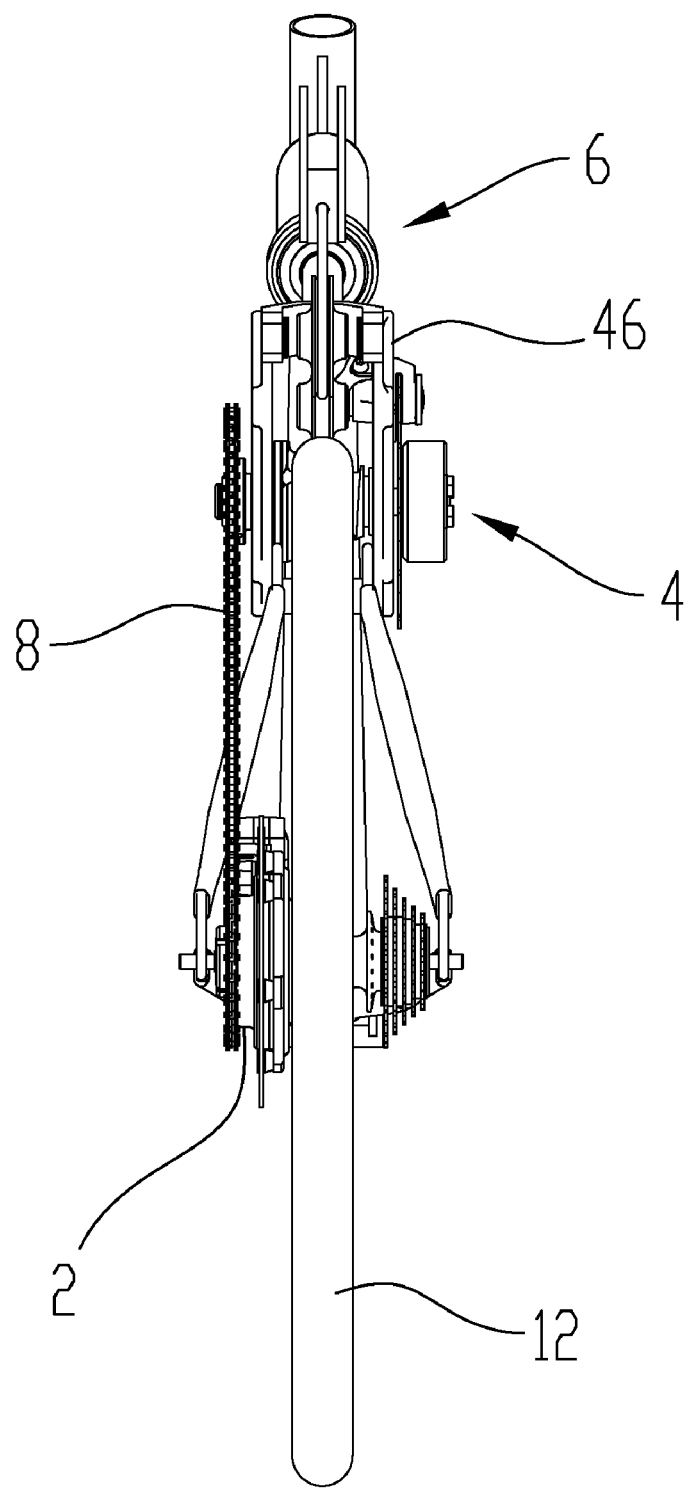
FIG. 3 is a rear view of a partially assembled bicycle showing the general arrangement of all regenerative braking system components.

Referring to FIGS. 1-3, the components of the bicycle regenerative braking system on a partially assembled bicycle can best be seen. The bicycle regenerative braking system has three major elements: a braking energy capture assembly 2; a braking energy transfer assembly 4; and a braking energy storage assembly 6. The braking energy capture assembly 2 is mechanically connected to the braking energy transfer assembly 4 by a looped media such as a roller chain 8 (FIG. 2), and the braking energy transfer assembly 4 is connected to the braking energy storage assembly 6 by a cable 10 thus enabling the capture, transfer, storage and release of the bicycle's braking energy to and from the bicycle's rear wheel 12. It is also well known in the industry that a linear drive line such as a driveshaft/right angled gear coupling could also accomplish the same result.

Control of the system is provided by an extra caliper brake lever on the left handlebar and twist grip cable pull or cable brake lever on the right handlebar that disengages caliper brake 78 to allow the pressurized, stored gas energy from the braking energy storage assembly to be released and transmitted as an applied torque to the vehicle's braking energy capture system which is interconnected with the vehicle's propulsion system.

Figure 5:
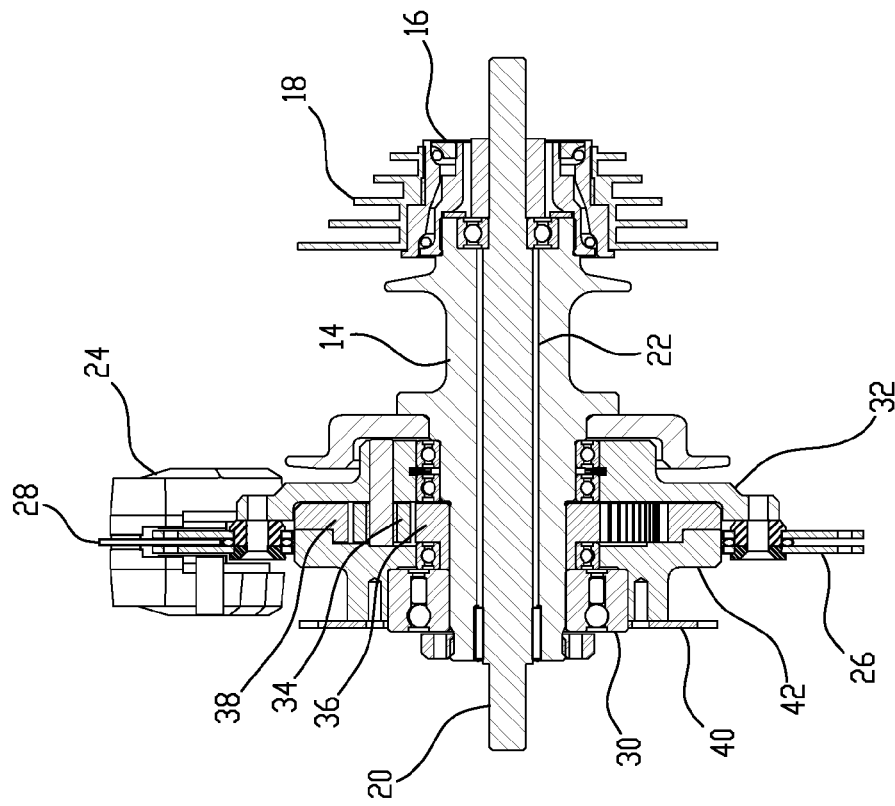
FIG. 5 is a cross sectional view of the capture energy transfer assembly taken through section A-A of FIG. 4.
Figure 4:
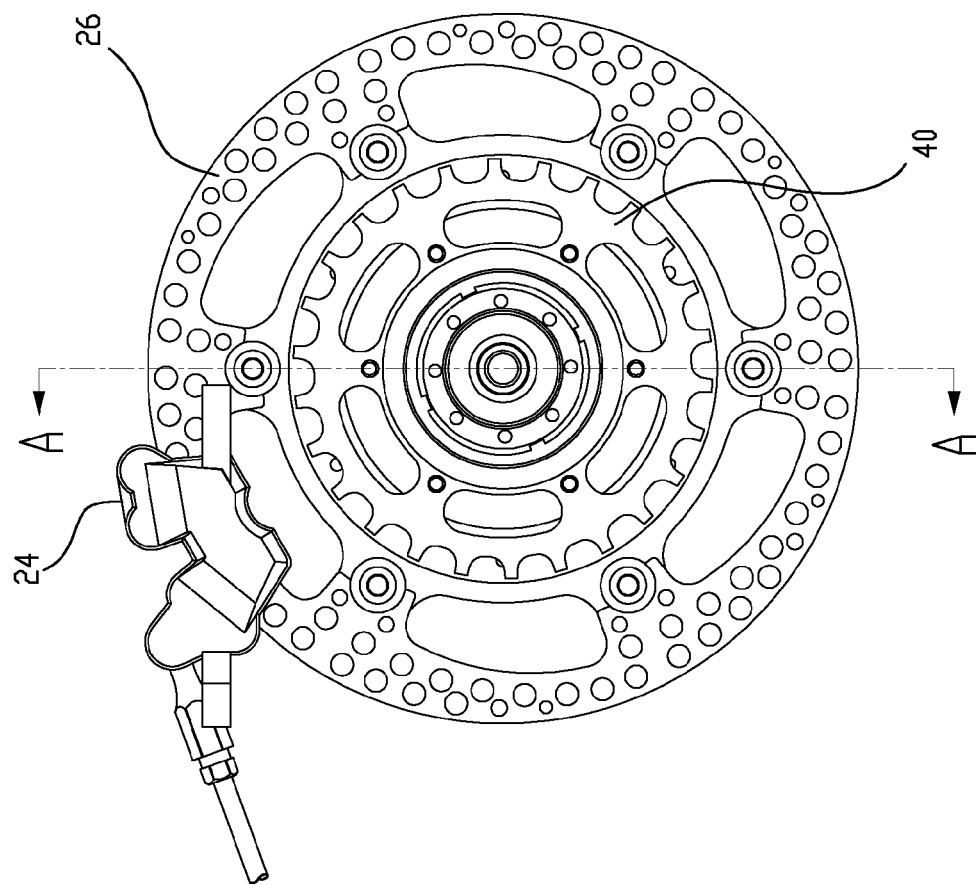
FIG. 4 is a side view of the braking energy capture assembly.

Looking at FIGS. 4 and 5 the components of the braking energy capture assembly 2 can best be seen. Here, conventional bicycle components including a rear wheel hub and sprocket cluster along with a modified caliper brake have been coupled with a planetary transmission assembly and a braking energy drive sprocket 40.

Onto the outboard side of a wheel hub 14 is mounted one side of an affixed freewheel clutch 16 that has its other side connected to a sprocket cluster 18. The wheel hub 14 is connected for rotation about a stationary axle 20 that is housed within a cylindrical bore 22 through the wheel hub's longitudinal center. The axle 20 is mounted at each end onto a set of rear forks 13. This type of arrangement is well known in the art. With this setup, the freewheel clutch 16 allows direct coupling between the sprocket cluster 18 and the wheel hub when rotation of the primary chain (not shown), sprocket cluster 18 and the bicycle wheel 12 is in the clockwise direction but uncouples the sprocket cluster 18 and allows the wheel hub 14 to independently rotate (free wheel) about the axle when there is no clockwise rotation of the primary chain and sprocket cluster 18.

Onto the inboard side of the wheel hub 14 is mounted a disc brake assembly made of a cable or hydraulically activated caliper 24 that frictionally engages the outer surface of a pair of brake rotor discs 26 separated by a floating friction plate 28. The left side of the disc brake assembly has a one-way clutch 30 mounted to the outboard side of hub 14 while the right side of the brake rotor discs 26 is connected to a planetary gear set carrier plate 32 of a planetary gear transmission that is mounted on the wheel hub 14. On the carrier plate 32 is mounted three planet gears 34 that are functionally enmeshed with a sun gear 36 and a ring gear 38. The sun gear 36 is affixed to the wheel hub 14 and the ring gear 38 is affixed to a ring gear housing 42 which is affixed to a brake energy drive sprocket 40. The inner race of the one-way clutch 30 is connected to the wheel hub 14 and the outer race is connected to the housing 42 that the ring gear 38 and braking energy drive sprocket 40 are mounted to. This one-way clutch allows the wheel hub 14 and sun gear 36 to rotate forward with respect to the ring gear 38 and braking energy drive sprocket 40, but not backward. Forward is defined as the same direction as the wheel rotation when the bicycle is traveling forward or traditionally, clockwise.

In operation, the sun gear 36 of the planetary gear transmission is attached to and rotates with the wheel hub 14 and the brake rotor discs 26 rotate with the planet gear carrier 32. The brake rotor discs 26 are free to rotate until the rider stops them through the use of a brake lever that is actuated to close the caliper 24 as is well known in the art. Actuating the caliper 24 to stop the brake rotor discs 26 stops the rotation of the planet gear carrier 32 and the planet gears 34 stop revolving around the sun gear 36. This in turn starts the ring gear 38 rotating in the opposite direction of the sun gear 36. The brake energy drive sprocket 40 rotates with the ring gear 38 and transmits rotational power through a roller chain 8 to and from the braking energy transfer assembly 4.

Because of the planetary gearing, the torque required to stop the planet gear carrier 32 is more than twice the braking torque at the wheel 12. Because of this, dual brake rotor discs 26 and a floating friction plate 28 are used to increase the stopping torque of the disc brake assembly over that of a standard single disc brake by increasing the frictional drag area on the brake rotor discs 26.

Looking at FIGS. 6 and 7 the components of the braking energy transfer assembly 4 can best be seen. This assembly is rigidly mounted to the bicycle frame by a bracket 46 (FIG. 1) which allows the rotation of a decreasing diameter cable pulley shaft 44 as would be well known in the art. The cable pulley shaft 44 has a roller chain driven first transfer sprocket 48 affixed at one end, a cable pulley drum 50 in the middle, and a one-way transfer clutch assembly 52 affixed at the other end. The first transfer sprocket 48 is fixed to and rotates with the cable pulley shaft 44 and transmits power through a roller chain 8 to and from the brake energy drive sprocket 40. The cable pulley drum 50 is attached to and rotates with the cable pulley shaft 44. The cable pulley drum 50 has a concentrically wound cable groove of a decreasing diameter about its axial perimeter that is adapted for engagement with the cable 10. A strong, flexible cable 10 is wound around the cable pulley drum 50 with one end of it attached thereon by a clamping plate 56 or other suitable constraining arrangement. This end of the cable is thus coilable about the cable pulley drum 50 so as to shorten in length. The other end of the cable 10 is strung around an idler pulley 58 (FIG. 1) and then around a compression pulley 60 (FIG. 9) which is affixed to the end of the gas spring plunger 62, and then back to the mounting bracket 64 of the braking energy storage assembly 6. It is well known in the art that the pulley arrangement is a function of the mounted position of the braking energy transfer assembly 4 relative to the braking energy storage assembly 6. Although in the depicted embodiment two pulleys are used, a different mounting setup utilizing only one pulley has been successfully utilized.

One-way transfer clutch assembly 52 is affixed to the opposite end of the pulley shaft 44 that the first transfer sprocket 48 is affixed. The inner race of this one-way clutch 52 is attached to the pulley shaft 44 by a frictional locking hub 66. The outer race of the one-way clutch 52 is attached to a housing 68 that has dual transfer brake discs 70 mounted to it. An extension spring 72 attached to the brake caliper's actuator arm 74 keeps the transfer caliper brake 78 applied at all times except when the rider releases it by twisting the right handle grip which pulls on the brake release cable 76. This prevents the cable 10 (once coiled about the cable pulley) from unwinding until the transfer caliper brake 78 is released by the rider. Dual discs 70 and a floating friction plate 80 are used to increase the holding torque of the transfer caliper brake 78 over that of a standard single disc brake as described earlier.

Looking at FIGS. 8 and 9 the components of the braking energy storage assembly 6 can best be seen. A gas spring assembly consists of an outer cylinder 82, an end cap 84, a charging valve for the pre-pressurization of the enclosed gas, outer cylinder end seals 83, a guide bearing 86, a cylinder head 90, a shaft seal 88, a plunger 62, a compression pulley 60, a piston 92, and a piston seal 94. The guide bearing 86 and shaft seal 88 are attached to the cylinder head 90. The piston 92 is attached to one end of the plunger 62 and is of a larger diameter than the plunger 62. The piston 92 has a lip seal 94 between it and the cylinder 82 that prevents the flow of gas past the piston 92. The piston 92 is able to slide axially inside of the cylinder 82 and is captured between the guide bearing 86 and the end cap 84. The plunger 62 extends through the guide bearing 86 and shaft seal 88 to the outside of the cylinder. The piston 92 can also have at least one recess defined in it's faces with an orifice 95 in the recess to control the flow rate of the constrained gas from one side of the piston 92 to the other side and thus limit the speed of the travel of the plunger 62. This acts as a safety feature in the event that the plunger 62 is unrestricted upon a failure of the cable.

In prototype testing and performance, and under normal operation (6 to 12 inches of plunger travel per second), the orifice 95 has no effect. But should the cable break, the orifice would limit the speed of the plunger to approximately 60 inches per second so that no damage would occur. At the end of the plunger 62 opposite of the piston 92, a compression pulley 60 is mounted. The inside of the cylinder is charged with approximately 2,000 psi of gas, typically nitrogen. This pressurized gas pushes the plunger 62 out with a force of approximately 1,800 lbs which in turn causes the cable 10 to unwind off of the cable pulley drum 50, spinning the cable pulley drum 50, the cable pulley shaft 44, the first transfer sprocket 48, the roller chain 8 and the drive sprocket 40 which through the one-way clutch 30 turns hub 14 and the bicycle's wheel 12. The bicycle equipped with the above described regenerative braking system operates as follows. When the rider of the bicycle wants to slow or stop, he pulls on the disc brake lever that is connected by a standard brake cable or hydraulic line to the caliper 24 on the braking energy capture assembly 2. This stops the rotation of the planet gear carrier 32. Stopping the rotation of the carrier 32 causes the wheel hub 14, and sun gear 36 to drive the planet gears 34 which in turn drive the ring gear 38 and braking energy drive sprocket 40 in the opposite direction of the bicycle wheel 12. Through the connection by roller chain 8 and the first transfer sprocket 48 on the cable pulley shaft 44, the cable pulley drum 50 also rotates in the opposite direct of the wheel 12. This causes the cable to wind or coil up on the cable pulley drum 50 which in turn tensions and shortens cable 10 forcing the gas spring plunger 62 into the cylinder 82. The planetary gears, sprockets, cable pulley, and gas spring plunger are all sized in relation to each other to provide a torque to the wheel sufficient to stop the bicycle and rider in a reasonable distance.

Once the bicycle has stopped the rider can let go of the brake lever connected to the brake caliper 24 on the bicycle's braking energy capture system. The one-way transfer clutch assembly 52 on the cable pulley shaft 44, which is being stopped from rotating by the dual discs 70 and transfer caliper brake 78, prevents the cable 10 from being unwound by the compressed gas force constrained within the cylinder 82 attempting to drive outward the plunger 62.

If the bicycle and rider are traveling with more kinetic energy than the braking energy storage assembly 6 has the ability to store, the plunger 62 will bottom out and the torque on the brake rotor discs 26 will increase until they slip in the caliper 24. To the rider the caliper brake 24 will feel like a normal wheel disc brake. The harder the brake lever is squeezed, the quicker the bicycle will stop.

When the rider decides to pull away from a stop, he simply twists the right handle grip to release the brake discs 70 on the transfer clutch assembly 52 and allows the force of the gas spring plunger 62 to unwind the cable 10 from the cable pulley drum 50 which in turn causes the pulley shaft 44 to rotate. The first transfer sprocket 48 on the pulley shaft 44 rotates with it and through the roller chain 8 drives the braking energy drive sprocket 40 that is attached to the ring gear housing 42. The one-way clutch 30 connected between the ring gear housing 42 and wheel hub 14 transmits the torque of the sprocket 40 through to the wheel hub 14 which propels the bicycle and rider forward.

Because of the planetary gearing in the wheel hub assembly, the torque applied to the wheel during acceleration is higher than the torque applied to the wheel during braking by a ratio equal to the number of teeth on the ring gear divided by the number of teeth on the sun gear. This results in an acceleration rate while starting that is somewhat higher than the rate of acceleration while stopping.

The wheel hub and transmission can also be configured with the roles of the sun gear 36 and ring gear 38 reversed. That is, with the ring gear 38 connected to the wheel hub 14 and the sun gear 36 connected to the sprocket. This may be desirable because a rider would feel more in control with the lesser acceleration.

In alternative embodiments, the planetary gearing can be replaced by bevel gears set up in a differential arrangement with the brake being attached to the spider gear carrier. This has the advantage of having a one-to-one ratio which would make braking and starting both have the same acceleration rate. Such mechanical iterations are well known in the art.

The disclosed system uses two shafts with a chain drive between them. This gives the rider the ability to change sprockets and thus "tune" the system for different weather conditions and rider preferences. Since the same side of the chain is in tension for both braking and accelerating, a simple spring loaded tensioner on the slack side of the chain can be used to take up slack for different sized sprockets.

One advantage of the bicycle regenerative braking system is that it would prevent the bicycle from rolling backward when stopped on an incline.

The preferred design is for the cable pulley drum 50 to have a spiral groove for the cable 10 that starts on a large radius and progressively gets smaller as more cable is wrapped onto the pulley. This compensates for the fact that the force of the gas spring plunger 62 increases as the plunger 62 is forced into the cylinder 82. This results in a more constant braking torque instead of an ever increasing one.

A rack and pinion could be used instead of the cable and pulley to retract the gas spring plunger. The advantage of a rack and pinion would be that it can be more reliable than the cable and pulley. The disadvantages of the rack and pinion would be that it would be heavier and that it would not compensate for the fact that the force of the gas spring plunger increases as the plunger is forced into the cylinder.

The functionality of the braking energy capture assembly and the braking energy transfer assembly can be combined into one assembly. This would have the advantage of reducing cost but would increase the rolling resistance of the bicycle because the roller chain and sprockets connecting the wheel to the braking energy capture assembly would be turning at all times, not just when the bicycle was slowing or accelerating.

By way of a mathematical interpretation, the kinetic energy of a 40 lb bicycle and 190 lb rider traveling at 20 mph approximates 3070 lb-ft. Because of inefficiencies caused by the gears, bearings, sprockets and chain, about 90% of this energy, (2,885 lb-ft) would end up being stored in the gas spring. A 1¾ inch diameter bore gas spring with a 1 inch diameter plunger and an 18 inch stroke that is charged to 2,000 psi with nitrogen has the ability to store 2,900 lb-ft of energy that may be translated to rotational torque for the bicycle's wheels.

With the general concept of the present invention disclosed the first alternate embodiment in a motorized vehicle will be described.

A vehicle drive system comprises the following major components: A gas spring or multiple gas springs to store energy, a ball screw or roller screw assembly to convert the linear motion of the gas springs into rotary motion, a transmission to control the direction of rotation and amount of torque applied to the wheels, and a drive train including a differential assembly to transmit torque to the vehicle's wheels.

A ball screw can be used to convert the rotary motion of the wheels to the linear motion of the gas springs. Because a ball screw has constant pitch, it would be desirable to have at least two different gear ratios in the drive train between the wheels and the ball screw to provide more control of the torque applied to the wheels during both stopping and starting. The transmission can contain clutches and gears required to provide both forward and reverse torque to the wheels for stopping and starting the vehicle. The clutches in the transmission can be engaged hydraulically using power supplied by a pump on the vehicle's engine. A microprocessor can monitor the position of the plungers and the positions of the brake and accelerator pedals to control the operation of the system without the driver needing to operate the vehicle any differently than normal.

In a typical arrangement as shown in FIG. 10, the transmission 105 and differential 103 can be fixed to the vehicle chassis and torque would be transmitted to and from the rear wheels 100 through constant velocity joints 102 and drive shafts. A pinion gear 104 of the differential 103 can transmit torque to and from the transmission 105. The transmission 105 can contain both forward and reverse gearing to control the direction of torque, either opposing the direction the vehicle is moving (braking), or assisting (accelerating) the vehicle in the direction it is moving. The transmission 105 can also contain gear trains of different ratios to control the amount of torque transmitted to the wheels. Torque from the transmission 105 can be transmitted to and from the ball screw assembly through a one-way clutch 106.

The ball screw assembly can be connected to the transmission at the end opposite to the differential. The ball screw assembly would consist of the ball screw 109, a back stop clutch 108, a backstop brake 107 connected to the back stop clutch 108, and a ball screw nut 110. The ball screw nut 110 converts the rotary motion of the ball screw 109 into linear motion. With the backstop brake 107 engaged, the back stop clutch 108 allows the ball screw to rotate in one direction, that being in the direction to force the gas spring plungers 112 into the gas spring cylinders 113. This is the energy storage or braking mode. With the backstop brake 107 released, the gas spring plungers 112 are allowed to extend and the ball screw and nut would convert this linear motion into rotary motion that, through the one-way clutch 106, transmission 105, and drive train, would apply torque to the wheels and assist in propelling the vehicle.

The one-way clutch 106 allows a gear ratio in the transmission 105 to be engaged before the back-stop brake 107 is released, ensuring a smooth transition to the accelerating mode.

Installing this system in an automobile would provide the same fuel savings as an electric hybrid vehicle does but at a lower cost and with less added weight. It also would not have the environmental concerns that the hybrid's batteries have. The system can be scaled up to buses as well. Since buses make frequent stops, this can result in large fuel savings.

A 4,500 lb car at 40 mph has a kinetic energy of 240,000 lb-ft. A 9-inch diameter bore gas spring with a 6-inch diameter plunger and a 20-inch stroke that is charged to 2,000 psi with nitrogen has the ability to store 120,000 lb-ft of energy. Two of these gas springs used together has enough capacity to stop a 4,500 lb car from 40 mph and return it to approximately 30 mph.

A second alternate embodiment is the implementation of the regenerative braking system in a small motorized vehicle. In accordance with a second embodiment, a vehicle regenerative braking system can be comprised of the following major components: A gas spring or multiple gas springs to store energy, one or more high strength rope and pulley assemblies connected to one or more cable drum assemblies to convert the linear motion of the gas springs into rotary motion, a clutch assembly for engaging and disengaging the system, and a drive train including a differential assembly to transmit torque to the vehicle's wheels. This embodiment would be less expensive than the first alternate embodiment but would be less versatile. Because it lacks a multi-ratio transmission, it would only work in the forward direction and have a limited number of different torques for braking and accelerating the vehicle. The clutch and brakes can be engaged hydraulically using power supplied by a pump on the vehicle's engine. A microprocessor can monitor the position of the plungers and the positions of the brake and accelerator pedals to control the operation of the system without the driver needing to operate the vehicle any differently than normal.

Figures 11, 12:
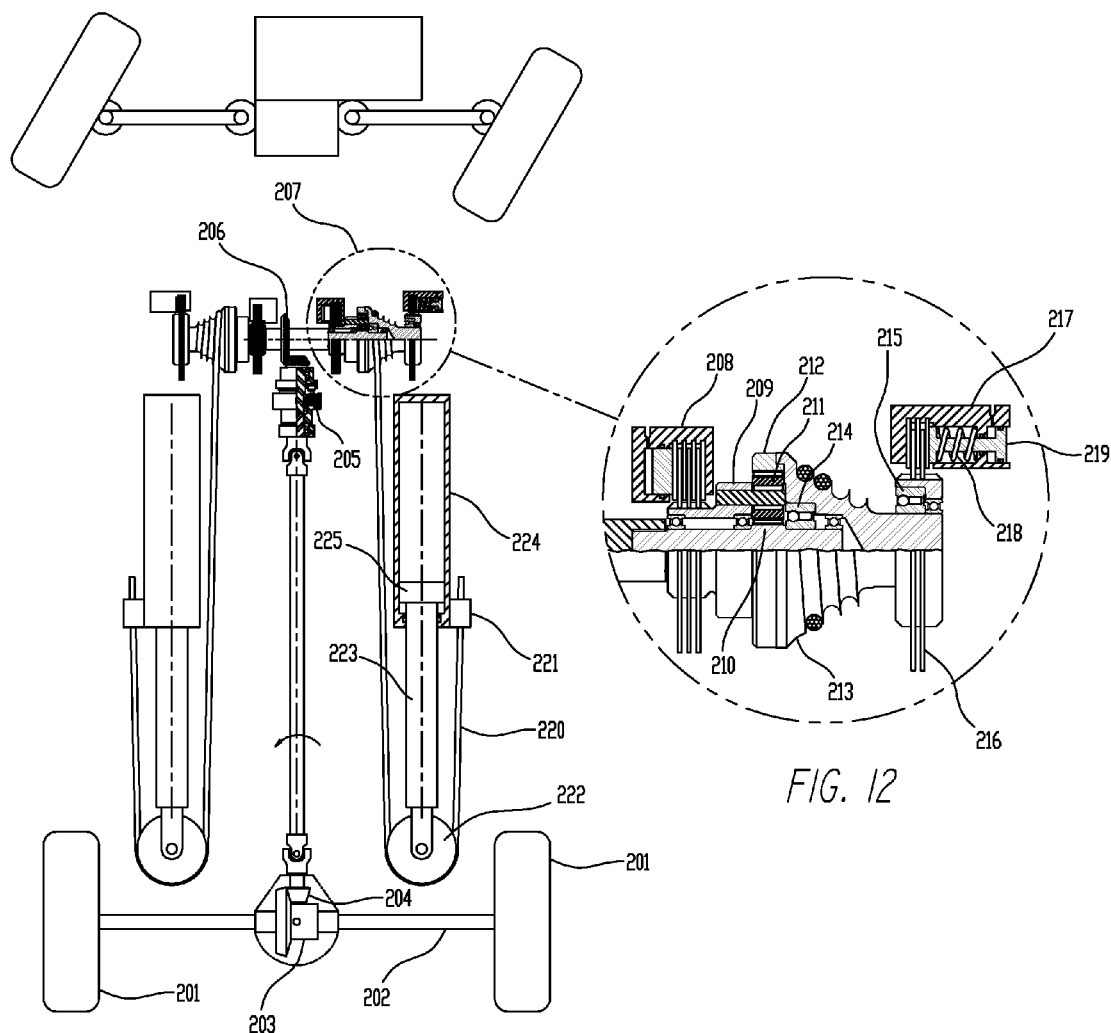
FIG. 11 is a top view representational diagram of the second alternate embodiment regenerative braking system.
FIG. 12 is an enlarged view of the braking energy capture and transfer systems of FIG. 11.

Referring to FIGS. 11 and 12, a pinion gear 204 of the differential 203 can transmit torque from the wheels 201 and axles 202, through a clutch 205 and bevel gears 206, to a cable drum assembly 207. The cable drum assembly 207 has one end of the cable 220 attached to it. The cable 220 can be strung around a pulley 222 and anchored at the other end by a clamp 221. The pulley 222 can be attached to a gas spring plunger 223 that is forced into the gas spring cylinder 224 when the cable 220 is wrapped onto the cable drum 213.

When the vehicle is moving forward and the clutch 205 is engaged and the planet carrier 209 is stopped by the carrier brake 208, the sun gear 210 drives the planet gears 211 which in turn drive the ring gear 212 and cable drum in the opposite direction of the sun gear 210. The one way clutch 214 is mounted between the cable drum 213 and the sun gear shaft and only allows the cable drum 213 to rotate in the opposite direction of the sun gear 210. When the cable drum 213 turns, it pulls on the cable 220, which forces the gas spring plunger 223 into the gas spring cylinder 224. This is the energy storage (braking) mode of the system. The one way clutch 215 has its outer race held from turning by brake discs 216 and spring loaded brake caliper 217. The one way clutch 215 allows the cable drum 213 to wind up the cable 220, but does not allow the cable to unwind and propel the vehicle until the caliper 217 is released.

When the caliper 217 is pressurized, the caliper piston 219 compresses the spring 218 and releases the brake discs 216. This allows the cable drum 213, which has the cable 220 pulling on it, to rotate. When the cable drum 213 rotates, it transmits torque through the one way clutch 214 to the sun gear shaft and to the bevel gears 206. With the clutch 205 engaged, torque is transmitted from the bevel gears 206 to the differential 203 and out to the wheels 201, which propels the vehicle forward. This is the regenerative (acceleration) mode.

The clutch 205 can be engaged prior to the caliper 217 being released to prevent the bevel gears from freewheeling and wasting the stored energy. The clutch 205 must be released when the vehicle is required to go in reverse. The clutch 205 should also be released when the system is not being used for either braking or accelerating since releasing it reduces the number of moving parts in the system and thus reduces the overall drag of the system.

The preferred design is for the cable pulley to have a spiral groove for the cable that starts on a large radius and progressively gets smaller as more cable is wrapped onto the pulley. This compensates for the fact that the force of the gas spring plunger increases as the plunger is forced into the cylinder. This results in a more constant braking torque instead of an ever increasing one.

It is preferred to have multiple cable drum and gas spring assemblies to give the system variability in braking and acceleration torques. When hard braking is desired, the planet gear carriers 209 of multiple cable drums can be stopped at the same time. When lighter braking is desired, the planet gear carriers 209 can be stopped one at a time. Likewise, when accelerating, releasing multiple cable drum brake calipers 217 at the same time will cause the vehicle to accelerate quickly, while releasing the calipers 217 one at a time will cause the vehicle to accelerate more slowly.

This second alternate embodiment is made possible because of the new high tech rope fibers that are now available. As an example, a one inch diameter aramid fiber rope can have a breaking strength of 125,000 lbs. In the example below, the maximum pull on the rope would be about 25,000 lbs which is twenty percent of the breaking strength. Twenty percent of breaking strength can be considered a safe working load. This second alternate embodiment would be less expensive than the first alternate embodiment and thus would be desirable for use in smaller, less expensive vehicles.

A 3,600 lb car at 40 mph has a kinetic energy of 190,000 lb-ft. A 6.5-inch diameter bore gas spring with a 4.5-inch diameter plunger and a 27-inch stroke that is charged to 2,000 psi with nitrogen has the ability to store 92,000 lb-ft of energy. Two of these gas springs used together has enough capacity to stop a 3,600 lb car from 40 mph and return it to approximately 30 mph.

Figures 13, 14:
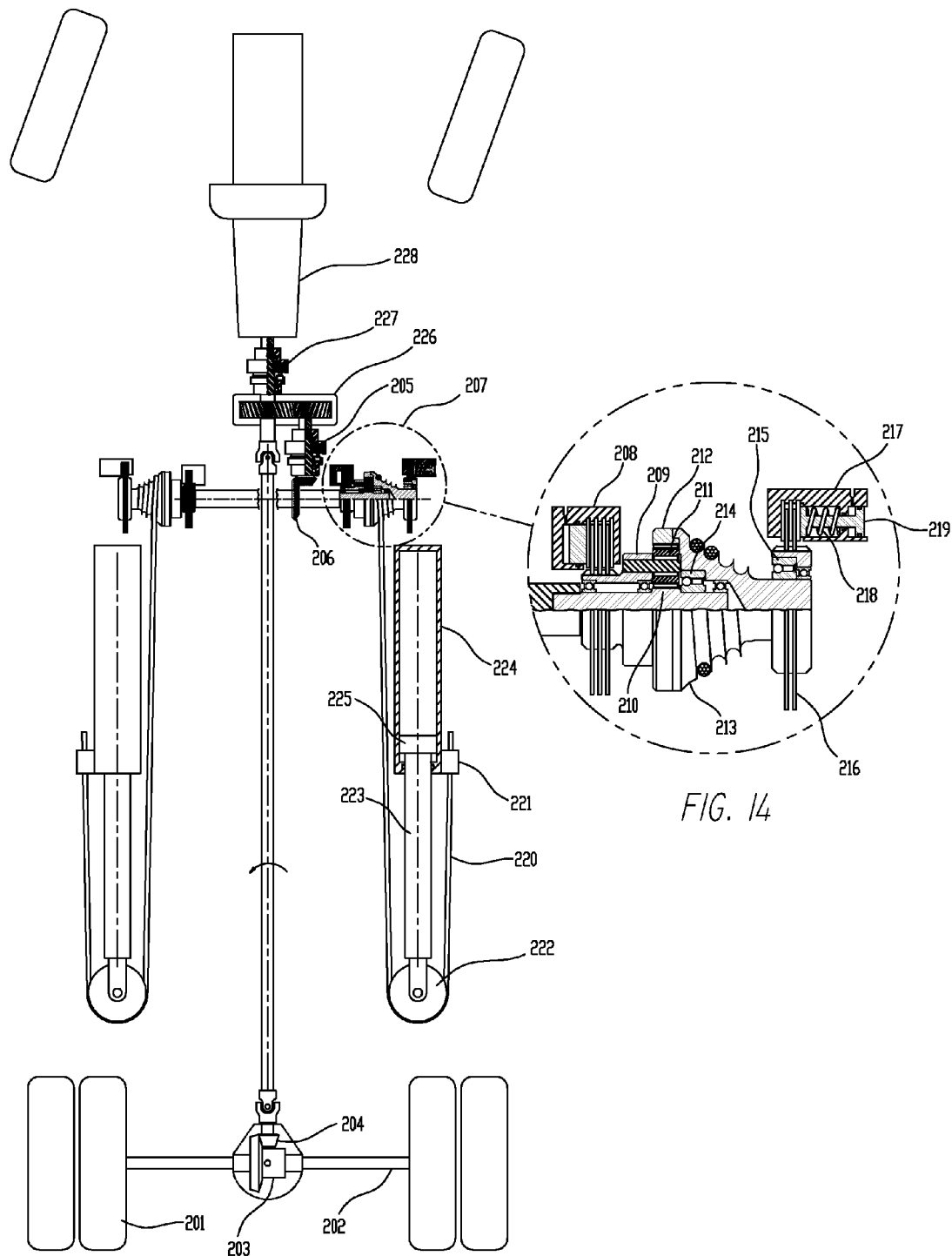
FIG. 13 is a top view representational diagram of the third alternate embodiment regenerative braking system.
FIG. 14 is an enlarged view of the braking energy capture and transfer systems of FIG. 13.

Whereas the first and second alterative embodiments showed the regenerative braking system implemented on front wheel drive vehicles without any connection to the normal drive train, a third alternate embodiment is the implementation of the regenerative braking system in a rear wheel drive motorized vehicle such as a truck or a bus. Looking at FIGS. 13 and 14 it can be seen that this system (like the second alternate embodiment) is also comprised of the following major components: A gas spring or multiple gas springs to store energy, one or more high strength rope and pulley assemblies connected to one or more cable drum assemblies to convert the linear motion of the gas springs into rotary motion, a clutch assembly for engaging and disengaging the system, and a drive train including a differential assembly and a transmission to transmit torque to the vehicle's wheels. In this embodiment, the regenerative braking system is tied into the normal vehicle drive train through the transfer case 226 on the transmission 228. A second clutch 227 can be used to disengage the engine and transmission during acceleration so that regenerative braking energy is not lost to the engine. The clutch and brakes can be engaged hydraulically using power supplied by a pump on the vehicle's engine. A microprocessor can monitor the position of the plungers and the positions of the brake and accelerator pedals to control the operation of the system without the driver needing to operate the vehicle any differently than normal.

There has been no need to this point to describe the actual drive train of the bicycle. These are well known in the art and function independently of the previously described principle embodiment. Generally, this drive train is made up of a crank assembly 15 (FIG. 22) with a toothed sprocket 17 for rotatably housing a proximate end of a roller chain that has its distal end rotatably housed about a sprocket cluster 18 affixed to a wheel hub 14 that is mechanically connected so as to rotate the rear wheel 12 and tire of the vehicle.

Figure 15:
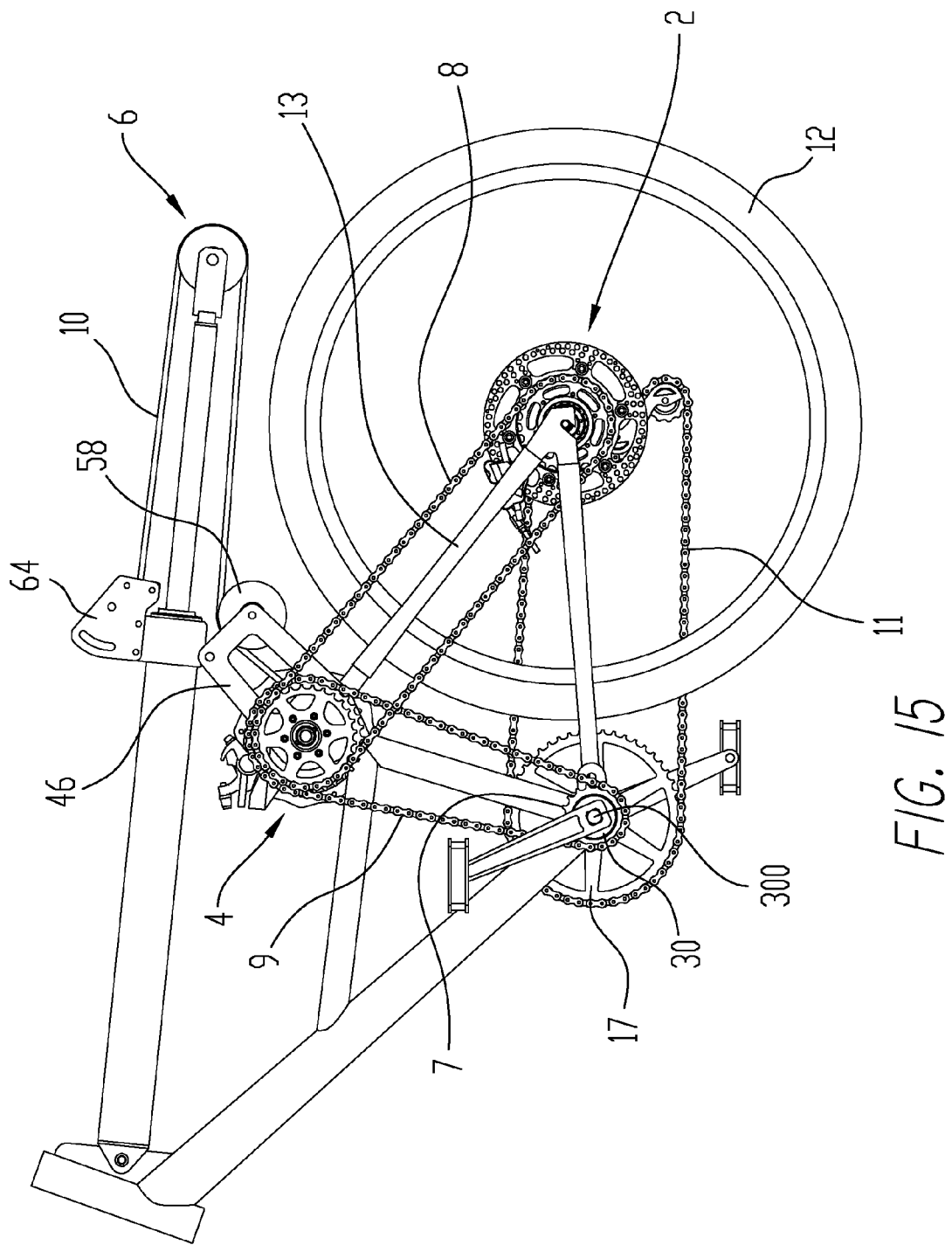
FIG. 15 is a left side view of the fourth alternate embodiment.
Figure 16:
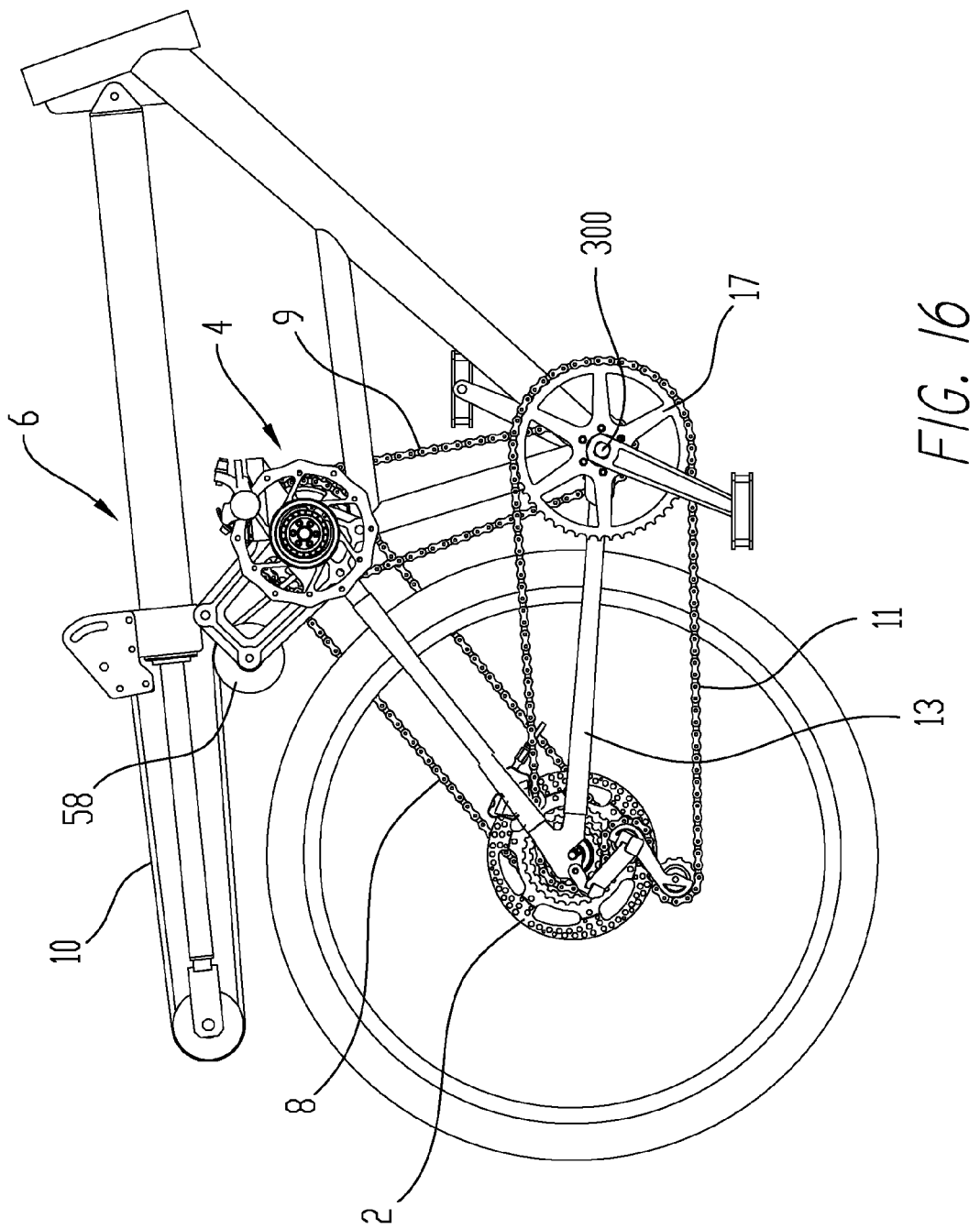
FIG. 16 is a right side view of the fourth alternate embodiment.
Figures 17, 18:
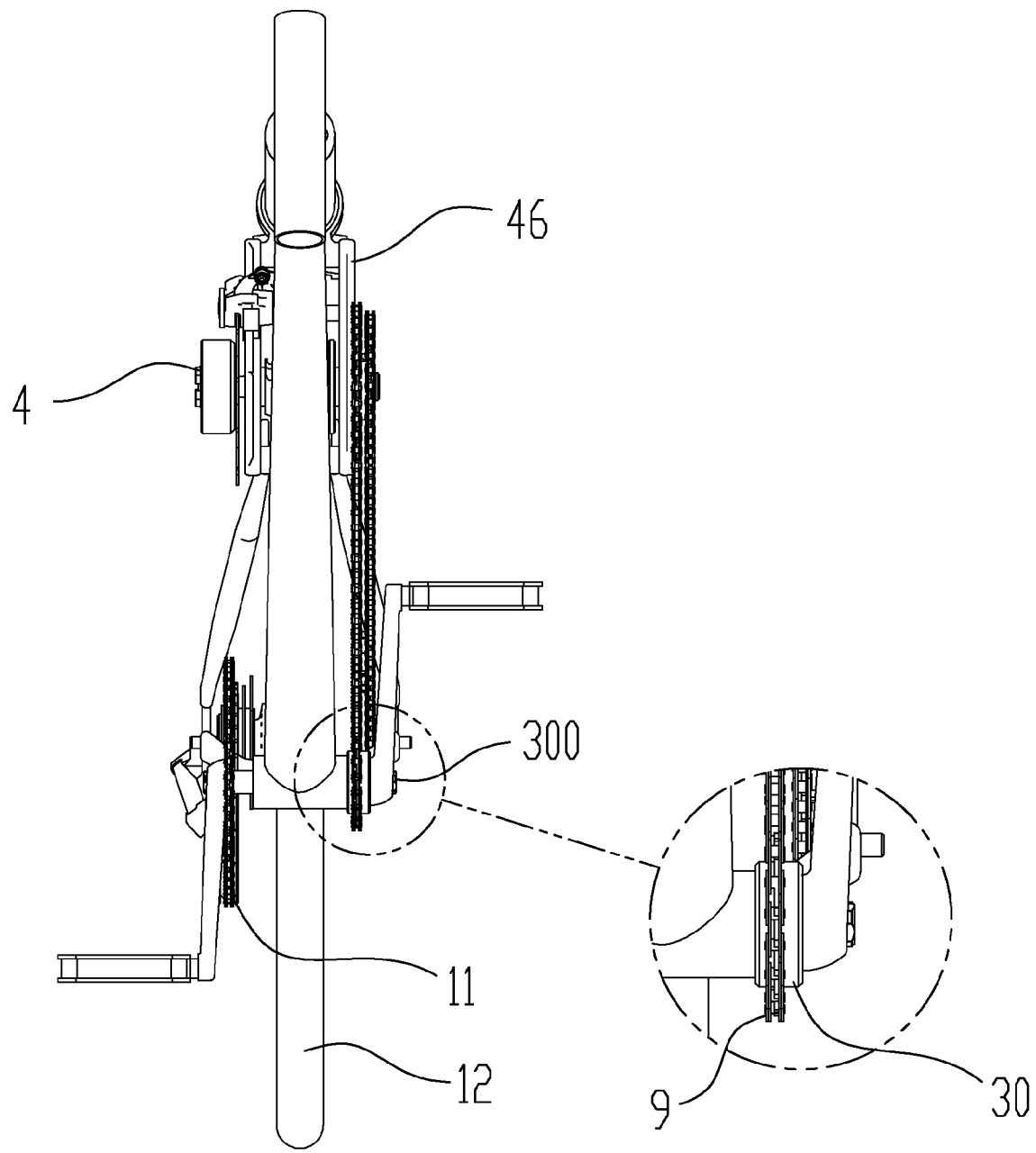
FIG. 17 is a front view of the fourth alternate embodiment.
FIG. 18 is an enlarged detail of the one way clutch and sprocket of FIG. 17.

In the earlier described principle embodiment the energy stored and then transferred into the rear wheel and tire was not transmitted through the vehicle's drive train, but rather was transferred from the braking energy storage assembly through the braking energy transfer assembly to the rear wheel and tire. Here in the fourth alternate embodiment the energy stored is transferred to the rear wheel and tire through a modified vehicle drive train. In this modification the crank assembly 15 has an additional crank sprocket 7 (FIG. 15) and one-way clutch 30 that allows a rotatable connection to a second transfer sprocket 49 (FIG. 21) of the braking energy transfer system via another roller chain 9.

FIGS. 15 to 22 show the fourth alternate embodiment. This embodiment is a hybrid of the preferred embodiment wherein it adds additional components to the braking energy transfer assembly and the crank assembly 15 of the drive train. Here the one-way clutch 30 (FIG. 5) out of the braking energy capture assembly is removed and put onto the crank assembly shaft 300. (FIG. 15) A second transfer sprocket 49 is added parallel and adjacent to the first transfer sprocket 48 of the braking energy transfer assembly. An additional crank sprocket 7 is affixed to the outer side of the one-way clutch 30 which is affixed to the to the crank assembly shaft 300, and a second roller chain 9 rotatably connects these two sprockets. In this manner instead of the braking energy transfer assembly driving the wheel through the braking energy capture assembly, it would drive the crank assembly shaft 300 via crank sprocket 7 which would then in turn drive the wheel through an attached primary sprocket 17 of the normal drive train which utilizes a third roller chain 11 to rotationally drive sprocket cluster 18 as would be well known in the art.

Figure 19:
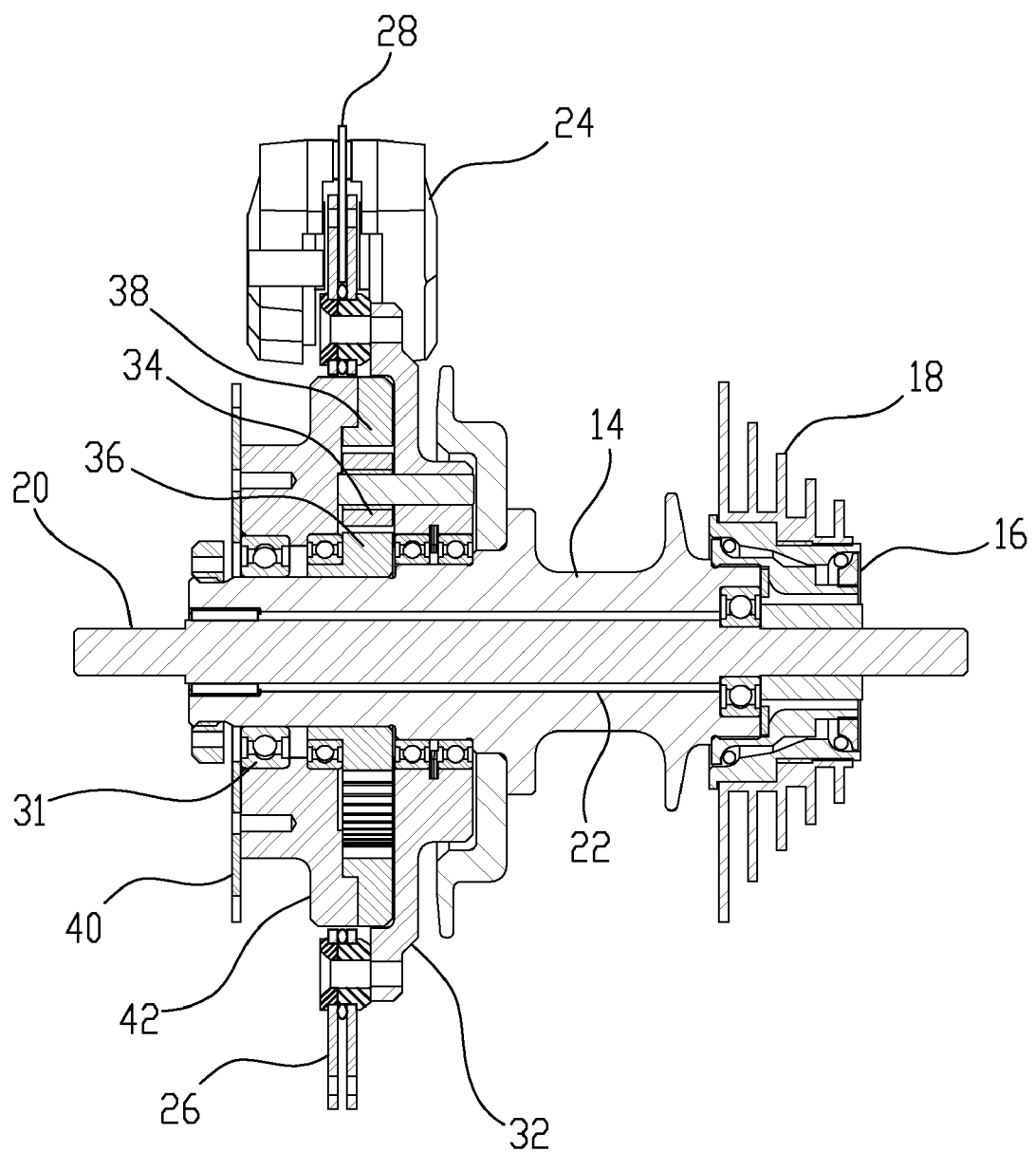
FIG. 19 is a cross sectional view of the capture assembly of the fourth alternate embodiment.

FIG. 19 clearly illustrates the energy capture assembly of the fourth alternate embodiment with one way clutch 30 removed and a stabilizing bearing 31 added. In FIGS. 20 and 21 the second transfer sprocket 49 and the parallel first transfer sprocket 48 configuration can best be seen.

Figure 22:
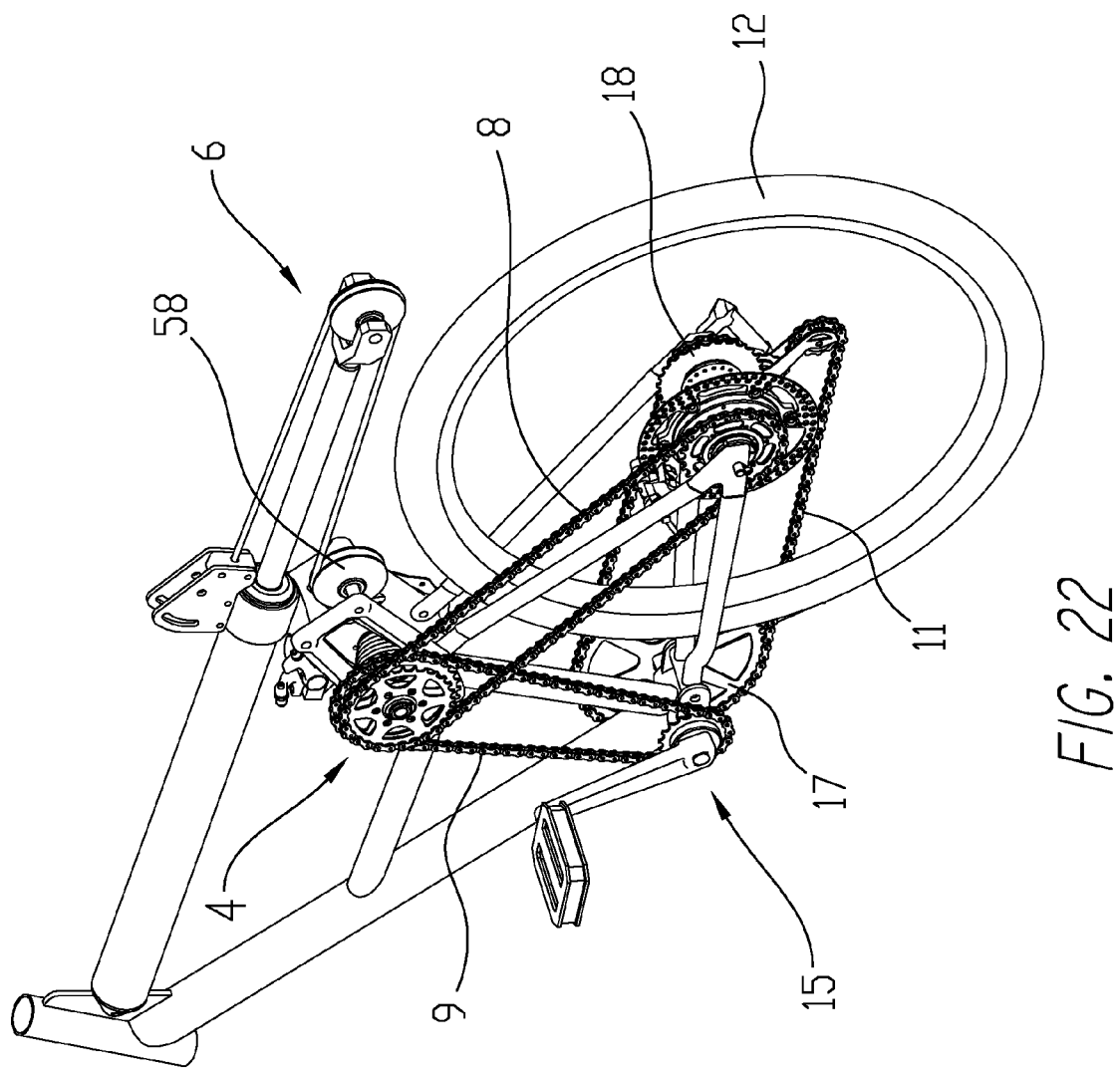
FIG. 22 is a rear perspective view of a partially assembled bicycle showing the general arrangement of all fourth alternate embodiment regenerative braking system components.

FIG. 22 shows the general arrangement of the braking energy capture assembly, the braking energy transfer assembly, and the braking energy storage assembly and the drive train of the fourth alternate embodiment.

This would accomplish two things: first, when accelerating the vehicle, less torque would be applied to the wheel but over a longer distance so as to become more of an assist than a driving force; second, it would allow the rider to store energy in the braking energy storage assembly by pedaling backwards. This would be an advantage if the rider was coming up on a hill and wanted to store some energy ahead of the hill to help climb the hill or if the rider was coming to a stop from a slow speed and wanted to add to the stored energy for a better start away from the stop.

The above description will enable any person skilled in the art to make and use this invention. It also sets forth the best modes for carrying out this invention. In view of the many possible embodiments, both motorized and not, to which the principles of the disclosed invention may be applied, it should be recognized that the illustrated embodiments are only preferred examples of the invention and should not be taken as limiting the scope of the invention. For example, although the preferred embodiment is configured for use with a bicycle, it could just as easily be used on a tricycle or quadricycle. Rather, the scope of the invention is defined by the following claims. I therefore claim as my invention all that comes within the scope and spirit of these claims.

Having thus described the invention, what is claimed as new and desired to be secured by Letters Patent is as follows:

1. A regenerative braking system for a vehicle comprising:
   a braking energy capture assembly;
   a braking energy transfer assembly; and
   a braking energy storage assembly;
   wherein said braking energy capture assembly is rotationally connected to said braking energy transfer assembly, and said braking energy transfer assembly is connected to said braking energy storage assembly by a coilable length of tensionable cable, and wherein said braking energy capture assembly transfers rotational energy of the vehicle to rotational energy of said braking energy transfer assembly which transfers said rotational energy into a linear motion of said braking energy storage assembly via a cable, and said braking energy storage assembly converts said linear motion into pressure energy and stores said pressure energy in a gas spring that has a moveable gas spring plunger that extends therefrom.

2. The regenerative braking system of claim 1 wherein said braking energy capture assembly comprises:
   a wheel hub rotationally housed about a stationary axle, said wheel hub having a first end and a second end;
   a gear sprocket affixed to said first end;
   a freewheel clutch affixed between said gear sprocket and said stationary axle;
   a first disc brake assembly affixed to said second end having a cable actuated first caliper with at least one brake rotor first disc connected to a carrier plate that houses a set of planetary gears enmeshed with a ring gear and a sun gear of a planetary gear transmission wherein said sun gear is affixed to said wheel hub and said ring gear is mounted onto a brake energy drive sprocket;
   a one way clutch connected between said hub second end and said brake energy drive sprocket.

3. The regenerative braking system of claim 1 wherein said braking energy capture assembly is rotationally connected to said braking energy transfer assembly by a looped media.

4. The regenerative braking system of claim 3 wherein said looped media is a roller chain.

5. The regenerative braking system of claim 3 wherein said looped media is a belt.

6. The regenerative braking system of claim 2 wherein said first disc brake assembly has two brake rotor first discs.

7. The regenerative braking system of claim 1 wherein said braking energy transfer assembly comprises:
   a cable;
   a first mounting bracket affixed to said vehicle, said first bracket housing a rotatable axle having a first end and a second end wherein a driven transfer sprocket is affixed to said second end and a one way transfer clutch is affixed to said first end;
   a second disc brake assembly having a spring actuated second caliper and at least one second disc rotor connected to said transfer clutch;
   a cable pulley drum rigidly affixed to said rotatable axle wherein said drum has a concentrically wound cable groove of a decreasing diameter about its axial perimeter that is adapted for engagement with said cable; and
   wherein said cable connected at a first end to said drum and at a second end to said braking energy storage assembly.

8. The regenerative braking system of claim 7 wherein said second disc brake assembly has two brake rotor second discs.

9. The regenerative braking system of claim 8 wherein said roller chain rotationally connects said brake energy drive sprocket of said braking energy capture assembly to said driven transfer sprocket of said braking energy transfer assembly.

10. The regenerative braking system of claim 1 wherein said braking energy storage assembly comprises;
    a gas;
    a gas spring made of a cylinder housing a slidably engaged plunger with an outer end and an inner end frictionally fit into said cylinder so as to constrain said gas when compressed;
    a second mounting bracket;
    a compression pulley affixed to said outer end of said plunger; and
    wherein said second mounting bracket connects said gas spring to said vehicle.

11. The regenerative braking system of claim 10 wherein said cable is in rotational engagement with said compression pulley.

12. The regenerative braking system of claim 1 wherein said braking energy capture assembly is rotationally connected to said braking energy transfer assembly by a by a linear drive line.

13. A regenerative braking system for a vehicle comprising:
    a braking energy capture assembly of a wheel hub rotationally housed about a stationary axle, said wheel hub having a first end and a second end with a gear sprocket affixed to said first end, and a freewheel clutch affixed between said gear sprocket and said wheel hub, and a first disc brake assembly affixed to said second end having a first caliper with at least one brake rotor first disc connected to a carrier plate that houses a set of planetary gears enmeshed with a ring gear and a sun gear of a planetary gear transmission wherein said sun gear is affixed to said wheel hub and said ring gear is mounted onto a brake energy drive sprocket, and a one way clutch connected between said hub second end and said brake energy drive sprocket;
    a braking energy transfer assembly made of a cable, a first mounting bracket affixed to said vehicle, said first bracket housing a rotatable axle having a first end and a second end wherein a driven transfer sprocket is affixed to said second end and a one way transfer clutch is affixed to said first end, and a second disc brake assembly having a spring actuated second caliper and at least one second disc rotor connected to said transfer clutch, and a cable pulley drum rigidly affixed to said rotatable axle wherein said drum has a concentrically wound cable groove of a decreasing diameter about its axial perimeter that is adapted for engagement with said cable, and wherein said cable connected at a first end to said drum and at a second end to a braking energy storage assembly; and a braking energy storage assembly made of a gas, and a gas spring made of a cylinder housing a slidably engaged plunger with an outer end and an inner end frictionally fit into said cylinder so as to constrain said gas when compressed, and a second mounting bracket, and a compression pulley affixed to said outer end of said plunger, and wherein said second mounting bracket connects said gas spring to said vehicle;

wherein said braking energy capture assembly is rotationally connected to said braking energy transfer assembly by a roller chain.

14. A regenerative braking system for a vehicle comprising:
   a braking energy capture assembly;
   a braking energy transfer assembly; and
   a braking energy storage assembly; and
   a drive train
   wherein said braking energy capture assembly is rotationally connected to said braking energy transfer assembly by a first roller chain, and said braking energy transfer assembly is connected to said braking energy storage assembly by a coilable length of cable, and the braking energy transfer system is connected to the drive train by a second roller chain.

15. The regenerative braking system of claim 14 wherein said braking energy capture assembly is a wheel hub rotationally housed about a stationary axle, said wheel hub having a first end and a second end with a gear sprocket affixed to said first end, and a freewheel clutch affixed between said gear sprocket and said wheel hub, and a first disc brake assembly affixed to said second end having a first caliper with at least one brake rotor first disc connected to a carrier plate that houses a set of planetary gears enmeshed with a ring gear and a sun gear of a planetary gear transmission wherein said sun gear is affixed to said wheel hub and said ring gear is mounted onto a brake energy drive sprocket, and wherein said braking energy transfer assembly is a cable, a first mounting bracket affixed to said vehicle, said first bracket housing a rotatable axle having a first end and a second end wherein a first driven transfer sprocket and a parallel second driven transfer sprocket is affixed to said second end and a one way transfer clutch is affixed to said first end, and a second disc brake assembly having a spring actuated second caliper and at least one second disc rotor connected to said transfer clutch, and a cable pulley drum rigidly affixed to said rotatable axle wherein said drum has a concentrically wound cable groove of a decreasing diameter about its axial perimeter that is adapted for engagement with said cable, and
   wherein said cable connected at a first end to said drum and at a second end to a braking energy storage assembly, and wherein said braking energy storage assembly is a gas, and a gas spring made of a cylinder housing a slidably engaged plunger with an outer end and an inner end frictionally fit into said cylinder so as to constrain said gas when compressed, and a second mounting bracket, and a compression pulley affixed to said outer end of said plunger, and wherein said second mounting bracket connects said gas spring to said vehicle;

wherein said drive train comprises a crank assembly with a one-way clutch disposed between a crank sprocket and a crank assembly shaft and a primary sprocket for rotatably housing a proximate end of a third roller chain that has its distal end rotatably housed about a sprocket cluster affixed to a wheel hub that is mechanically connected so as to rotate the rear wheel of the vehicle.

* * * * *